United States Patent
Albero et al.

(10) Patent No.: US 12,417,267 B2
(45) Date of Patent: Sep. 16, 2025

(54) SECURE USER AUTHENTICATION THROUGH HARDWARE ANALYSIS AND MONITORING

(71) Applicant: Bank of America Corporation, Charlotte, NC (US)

(72) Inventors: George Albero, Charlotte, NC (US); Morgan S. Allen, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 228 days.

(21) Appl. No.: 17/878,341

(22) Filed: Aug. 1, 2022

(65) Prior Publication Data
US 2024/0037198 A1    Feb. 1, 2024

(51) Int. Cl.
  *G06F 21/31* (2013.01)
  *G06F 21/32* (2013.01)
  *G06F 21/00* (2013.01)

(52) U.S. Cl.
  CPC ............ *G06F 21/316* (2013.01); *G06F 21/31* (2013.01); *G06F 21/32* (2013.01); *G06F 21/00* (2013.01)

(58) Field of Classification Search
  CPC .......... G06F 21/00; G06F 21/31; G06F 21/32; G06F 21/316
  See application file for complete search history.

(56) References Cited

U.S. PATENT DOCUMENTS

| | | | |
|---|---|---|---|
| 9,298,914 B1 * | 3/2016 | McCorkendale | G06F 21/552 |
| 10,021,108 B2 * | 7/2018 | Mankovskii | H04L 63/105 |
| 2006/0282660 A1 | 12/2006 | Varghese et al. | |

(Continued)

FOREIGN PATENT DOCUMENTS

| | | | |
|---|---|---|---|
| CN | 111163087 B | * | 8/2020 |
| KR | 20220115853 A | * | 8/2022 |

OTHER PUBLICATIONS

"Cyber Security Baselines and Anomaly Detection"—10DSecurity, Oct. 12, 2016 https://10dsecurity.com/blog-cyber-security-baselines-anomaly-detection.html (Year: 2016).*

(Continued)

*Primary Examiner* — Randy A Scott
(74) *Attorney, Agent, or Firm* — Banner & Witcoff, Ltd.

(57) ABSTRACT

Arrangements for secure user authentication through hardware analysis and monitoring are provided. In some aspects, a computing platform may receive, from one or more hardware devices, user interaction data. The computing platform may establish a baseline indicating an expected usage pattern of the user. The computing platform may receive, from the one or more hardware devices, subsequent user interaction data and determine whether the subsequent data is unauthorized. Based on the subsequent data not being unauthorized, the computing platform may calculate an updated baseline in real-time as the subsequent data is received. The computing platform may monitor for additional user interaction data from the one or more hardware devices and compare the additional user interaction data with the updated baseline. In response to the additional user interaction data deviating from the updated baseline by a predetermined threshold, the computing platform may identify an anomaly and transmit a security notification.

18 Claims, 8 Drawing Sheets

(56) References Cited

U.S. PATENT DOCUMENTS

| | | |
|---|---|---|
| 2010/0293094 A1 | 11/2010 | Kolkowitz et al. |
| 2012/0204257 A1 | 8/2012 | O'Connell et al. |
| 2013/0044055 A1 | 2/2013 | Karmarkar et al. |
| 2014/0325646 A1 | 10/2014 | Turgeman et al. |
| 2014/0344927 A1 | 11/2014 | Turgeman et al. |
| 2015/0135309 A1 | 5/2015 | Karmarkar et al. |
| 2015/0310196 A1 | 10/2015 | Turgeman et al. |
| 2016/0239649 A1* | 8/2016 | Zhao ................... H04W 12/065 |
| 2016/0307191 A1 | 10/2016 | Turgeman et al. |
| 2017/0017781 A1 | 1/2017 | Turgeman |
| 2017/0324758 A1 | 11/2017 | Hart et al. |
| 2018/0012003 A1 | 1/2018 | Asulin et al. |
| 2018/0224989 A1 | 8/2018 | Deasy et al. |
| 2019/0109849 A1 | 4/2019 | Frempong et al. |
| 2019/0377853 A1 | 12/2019 | Obaidi |
| 2020/0089863 A1 | 3/2020 | Deasy et al. |
| 2021/0029112 A1 | 1/2021 | Palle et al. |
| 2021/0075619 A1 | 3/2021 | Chereshnev |
| 2021/0099329 A1* | 4/2021 | Hellfajer ............. H04L 27/2657 |
| 2021/0226945 A1 | 7/2021 | Bud et al. |
| 2021/0279311 A1 | 9/2021 | Grewal et al. |
| 2022/0012317 A1 | 1/2022 | Byrne |
| 2022/0070182 A1 | 3/2022 | Bowditch et al. |
| 2022/0114594 A1 | 4/2022 | Nunes et al. |
| 2022/0179982 A1 | 6/2022 | Budman et al. |
| 2022/0237271 A1 | 7/2022 | Patel |
| 2022/0269987 A1* | 8/2022 | Delgado ........... G06F 16/24578 |

OTHER PUBLICATIONS

"I Can Be You: Questioning the Use of Keystroke Dynamics as Biometrics"—Meng et al., School of Information Systems, Singapore Management University, Sep. 2017 https://www.ndss-symposium.org/wp-content/uploads/2017/09/01_1_0 (Year: 2017).*

* cited by examiner

SECURE USER AUTHENTICATION THROUGH HARDWARE ANALYSIS AND MONITORING

BACKGROUND

Aspects of the disclosure relate to electrical computers, systems, and devices for providing secure user authentication through hardware analysis and monitoring.

Unauthorized activity is a concern for enterprise organizations, customers, and users. Accordingly, effective ways to detect unauthorized activity are needed. Despite attempts to make static credentials more secure, for example by adopting dual authentication, current software-based techniques for user authentication are still vulnerable to security breaches and attacks. Accordingly, it would be advantageous to provide a tool for monitoring patterns of a user to detect potential anomalous or unauthorized activity through computer hardware.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated secure user authentication, including detecting anomalous or unauthorized activity.

In accordance with one or more embodiments, a computing platform having at least one processor, a communication interface, and memory may receive, from one or more hardware devices, user interaction data associated with a user using the one or more hardware devices. Responsive to receiving the user interaction data, the computing platform may establish a baseline indicating an expected usage pattern of the user. The computing platform may receive, from the one or more hardware devices, subsequent user interaction data associated with the user using the one or more hardware devices. The computing platform may determine whether the subsequent user interaction data is unauthorized. Based on the subsequent user interaction data not being unauthorized, the computing platform may calculate an updated baseline in real-time as the subsequent user interaction data is being received. The computing platform may monitor for additional user interaction data received from the one or more hardware devices. The computing platform may compare the additional user interaction data with the updated baseline. The computing platform may identify an anomaly in the user interaction data in response to the additional user interaction data deviating from the updated baseline by a predetermined threshold. The computing platform may transmit, to a computing device, a security notification indicating potential unauthorized activity. In addition, transmitting the security notification may cause the security notification to display on the computing device.

In some embodiments, the one or more hardware devices may include a peripheral device registered in a network device database.

In some examples, the one or more hardware devices may be frequency synchronized with a reference signal.

In some embodiments, receiving the user interaction data associated with a user using the one or more hardware devices may include receiving pressure data captured by a pressure sensor of a keyboard.

In some example arrangements, receiving the user interaction data associated with a user using the one or more hardware devices may include receiving cursor motion data or clicking data captured by a pointing device.

In some arrangements, receiving the user interaction data associated with a user using the one or more hardware devices may include receiving keystroke dynamics information.

In some examples, the one or more hardware devices may include a wearable computing device.

In some embodiments, receiving the user interaction data associated with a user using the one or more hardware devices may include receiving biometrics data captured by a wearable computing device.

In some arrangements, transmitting the security notification indicating potential unauthorized activity may include determining an amount of deviation from the updated baseline, and generating the security notification based on the amount of deviation from the updated baseline.

In some embodiments, calculating the updated baseline in real-time as the subsequent user interaction data is being received may include a moving average calculation.

In some examples, monitoring for additional user interaction data received from the one or more hardware devices may include monitoring usage behaviors at predetermined intervals.

In some arrangements, establishing the baseline indicating the expected usage pattern for the user may further include receiving geolocation data of a user device, and establishing the baseline based on the geolocation data of the user device.

In some arrangements, establishing the baseline indicating the expected usage pattern for the user may further include receiving data relating to an environmental condition at a geographic location of a user device, and establishing the baseline based on the environmental condition at the geographic location of the user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this ID respect.

As a brief introduction to the concepts described further herein, one or more aspects of the disclosure relate to secure user authentication through hardware analysis and monitoring. For example, one or more aspects of the disclosure may monitor patterns of a user to detect potential anomalies through computer peripherals such as a computer keyboard or mouse. Parameters that may be tracked include hardware used by a user, a user's typing speed, a user's typing pressure, cursor motion data on a mouse, paths followed by a user in a network, user activity during seasonal or other time periods, user's presence information, additional device data (e.g., smart device location data, wearable device data), and/or the like. Additional aspects of the disclosure may provide for continuous authentication using a continuously-updated baseline. For instance, a user may log in using credentials, and aspects of the disclosure may continuously verify that the user is still the authenticated user by comparing tracked parameters to the continuously-updated baseline. Additional aspects of the disclosure may track anomalies and take appropriate action, such as limit or restrict access to various systems or components, shut down access to various systems or components, send an alert, and/or the like.

Further aspects of the disclosure may leverage frequency hopping to check that the hardware used is in sync and approved. Even for new user account openings, additional aspects of the disclosure may detect lags and recognize anomalies.

These and various other arrangements will be discussed more fully below.

Figure 1A:
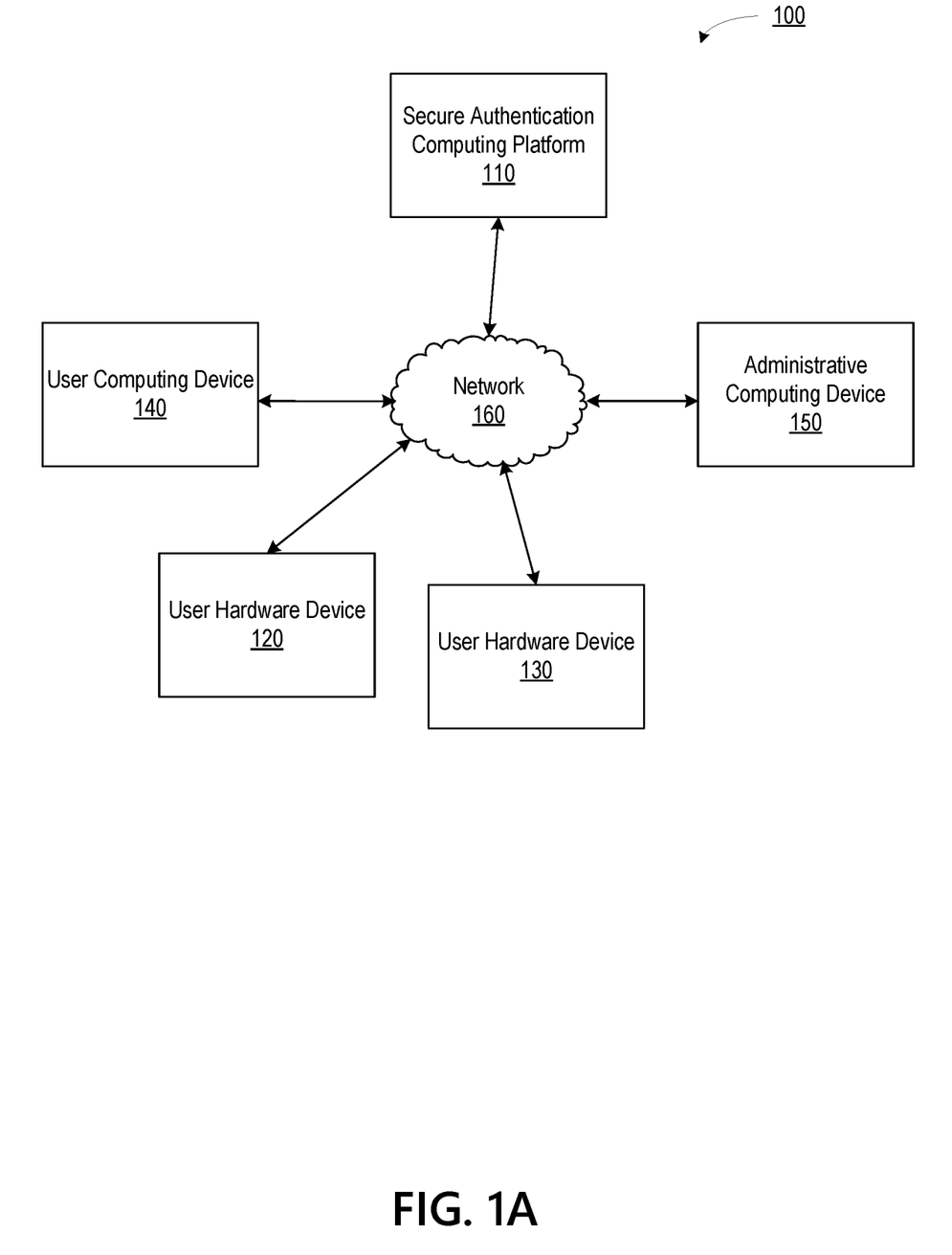
FIGS. 1A and 1B depict an illustrative computing environment for implementing secure authentication functions through hardware analysis and monitoring in accordance with one or more aspects described herein.
Figure 1B:
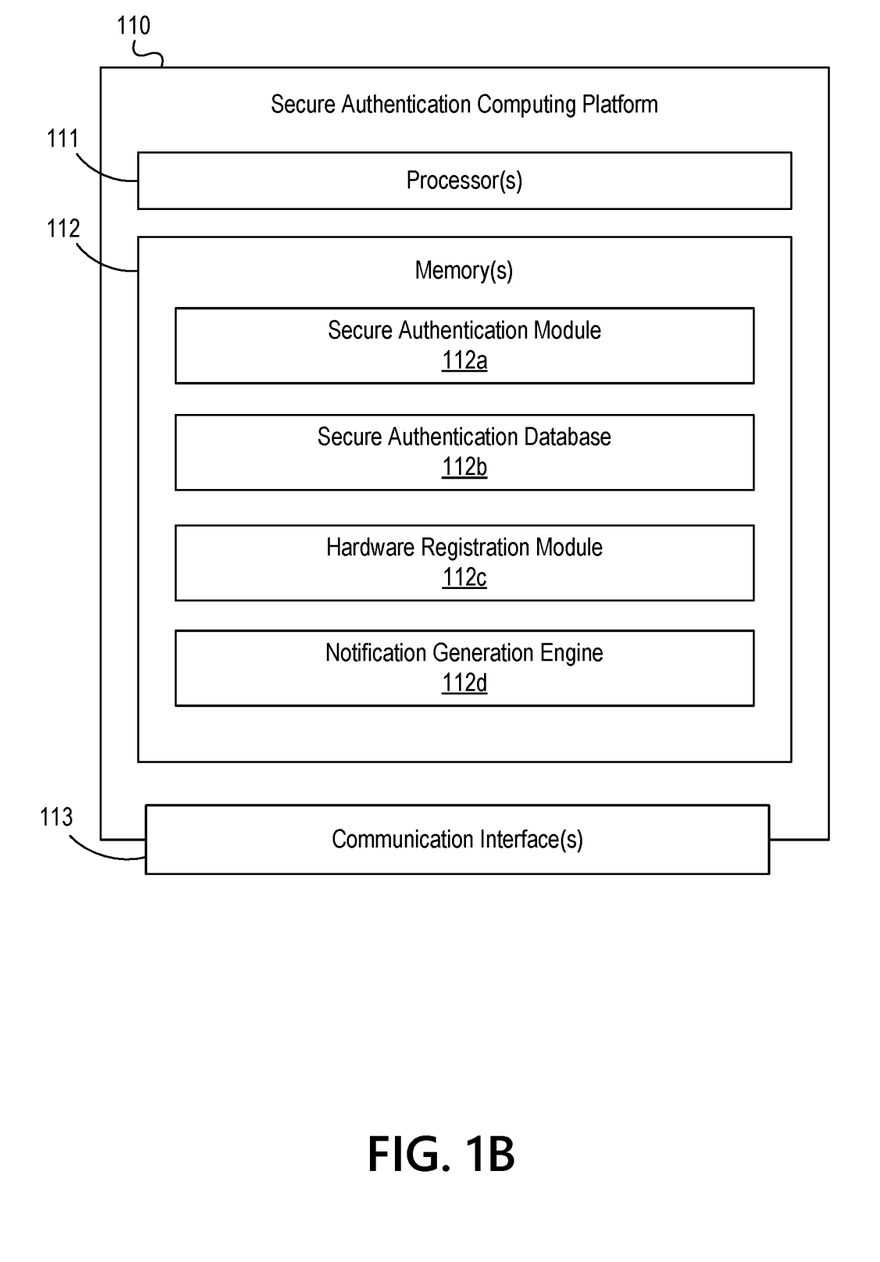

FIGS. 1A and 1B depict an illustrative computing environment for implementing secure authentication functions through hardware analysis and monitoring in accordance with one or more example embodiments. Referring to FIG. 1A, computing environment 100 may include one or more computer systems. For example, computing environment 100 may include secure authentication computing platform 110, user hardware device 120, user hardware device 130, user computing device 140, and administrative computing device 150. Although two user hardware devices 120, 130, one user computing device 140, and one administrative computing device 150 are shown, more or fewer devices or systems may be used without departing from the disclosure.

As described further below, secure authentication computing platform 110 may include one or more computing devices configured to perform one or more of the functions described herein. For example, secure authentication computing platform 110 may include one or more computers (e.g., laptop computers, desktop computers, servers, server blades, or the like) configured to provide secure user authentication through hardware analysis and monitoring and/or one or more other functions described herein.

User hardware device 120 and/or user hardware device 130 may be or include one or more hardware devices associated with a user computing device 140. User hardware device 120 and/or user hardware device 130 may include a mouse or a keyboard (or other peripheral device), a smart watch, a fitness tracker, or the like. User computing device 140 may be or include one or more computing devices associated with a user (e.g., a user registered with the system or customer of the enterprise organization requesting secure authentication). User computing device 140 may include a smartphone, smart watch or other wearable device, laptop computer, desktop computer, tablet device, or the like. User hardware device 120, user hardware device 130, and/or user computing device 140 may be pre-registered devices configured to capture user data and transmit user or device data to secure authentication computing platform 110 as requested or on a continuous or periodic basis.

Administrative computing device 150 may be or include one or more computing devices and/or other computer components (e.g., processors, memories, communication interfaces). For instance, administrative computing device 150 may be a server, desktop computer, laptop computer, tablet, mobile device, or the like, and may be used by an information security officer, administrative user, or the like. In addition, administrative computing device 150 may be associated with an enterprise organization operating secure authentication computing platform 110. In some examples, administrative computing device 150 may be used to configure, control, and/or otherwise interact with secure authentication computing platform 110, and/or one or more other devices and/or systems included in computing environment 100.

Computing environment 100 also may include one or more networks, which may interconnect one or more of secure authentication computing platform 110, user hardware device 120, user hardware device 130, user computing device 140, and administrative computing device 150. For example, computing environment 100 may include a network 160 (which may, e.g., interconnect instinctive secure authentication computing platform 110, user hardware device 120, user hardware device 130, user computing device 140, administrative computing device 150, and/or one or more other systems which may be associated with an enterprise organization, such as a financial institution, with one or more other systems, public networks, sub-networks, and/or the like).

In one or more arrangements, secure authentication computing platform 110, user hardware device 120, user hardware device 130, user computing device 140, and administrative computing device 150 may be any type of computing device capable of sending and/or receiving requests and processing the requests accordingly. For example, secure authentication computing platform 110, user hardware device 120, user hardware device 130, user computing device 140, administrative computing device 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of secure authentication computing platform 110, user hardware device 120, user hardware device 130, user computing device 140, and administrative computing device 150, may, in some instances, be special-purpose computing devices configured to perform specific functions.

Referring to FIG. 1B, secure authentication computing platform 110 may include one or more processor(s) 111, memory(s) 112, and communication interface(s) 113. A data bus may interconnect processor 111, memory 112, and communication interface 113. Communication interface 113 may be a network interface configured to support communication between secure authentication computing platform 110 and one or more networks (e.g., network 160 or the like). Memory 112 may include one or more program modules having instructions that when executed by processor 111 cause secure authentication computing platform 110 to perform one or more functions described herein and/or one or more databases and/or other libraries that may store and/or otherwise maintain information which may be used by such program modules and/or processor 111. In some instances, the one or more program modules and/or databases may be stored by and/or maintained in different memory units of secure authentication computing platform 110 and/or by different computing devices that may form and/or otherwise make up secure authentication computing platform 110.

For example, memory 112 may have, store, and/or include a secure authentication module 112*a* and a secure authentication database 112*b*. Secure authentication module 112*a* may have instructions that direct and/or cause secure authentication module 112*a* to execute advanced techniques to provide one or more hardware analysis and monitoring functions, such as establishing a continuously-updated baseline and comparing user interaction data to the continuously-updated baseline to identify or otherwise detect anomalous or unauthorized activity. Secure authentication database 112*b* may store information used by secure authentication module 112*a* and/or secure authentication computing platform 110 in application of advanced techniques to provide one or more anomaly detection functions, and/or in performing other functions. Database 112*b* may store data associated with hardware device registrations, hardware device inputs, usage patterns of a user, and/or the like.

Secure authentication computing platform 110 may further have, store and/or include a hardware registration module 112*c*. Hardware registration module 112*c* may store instructions and/or data that may cause or enable the secure authentication computing platform 110 to receive a user request to register a user hardware device with the system and generate a user record associated with the user. In some examples, the hardware registration data received and/or user record may include a user identifier, account identifier, hardware device identifier, or the like. In some examples, the user record may include a user identifier that is used to identify a user based on hardware used and use the identified user data to retrieve additional user or device data (e.g., a device identifier of a user computing device associated with the user).

Secure authentication computing platform 110 may further have, store and/or include notification generation engine 112*d*. Notification generation engine 112*d* may store instructions and/or data that may cause or enable the authentication computing platform 110 to send, to another computing device (e.g., user computing device 140, administrative computing device 150), notifications or results related to detection of potential anomalous or unauthorized activity. In some examples, if additional authentication data is requested, the notification generation engine 112*d* may generate a notification requesting additional authentication data, FIGS. 2A-2D depict an illustrative event sequence for implementing secure authentication functions through hardware analysis and monitoring in accordance with one or more example embodiments. The events shown in the illustrative event sequence are merely one example sequence and additional events may be added, or events may be omitted, without departing from the disclosure. Further, one or more processes discussed with respect to FIGS. 2A-2D may be performed in real-time or near real-time.

Figure 2A:
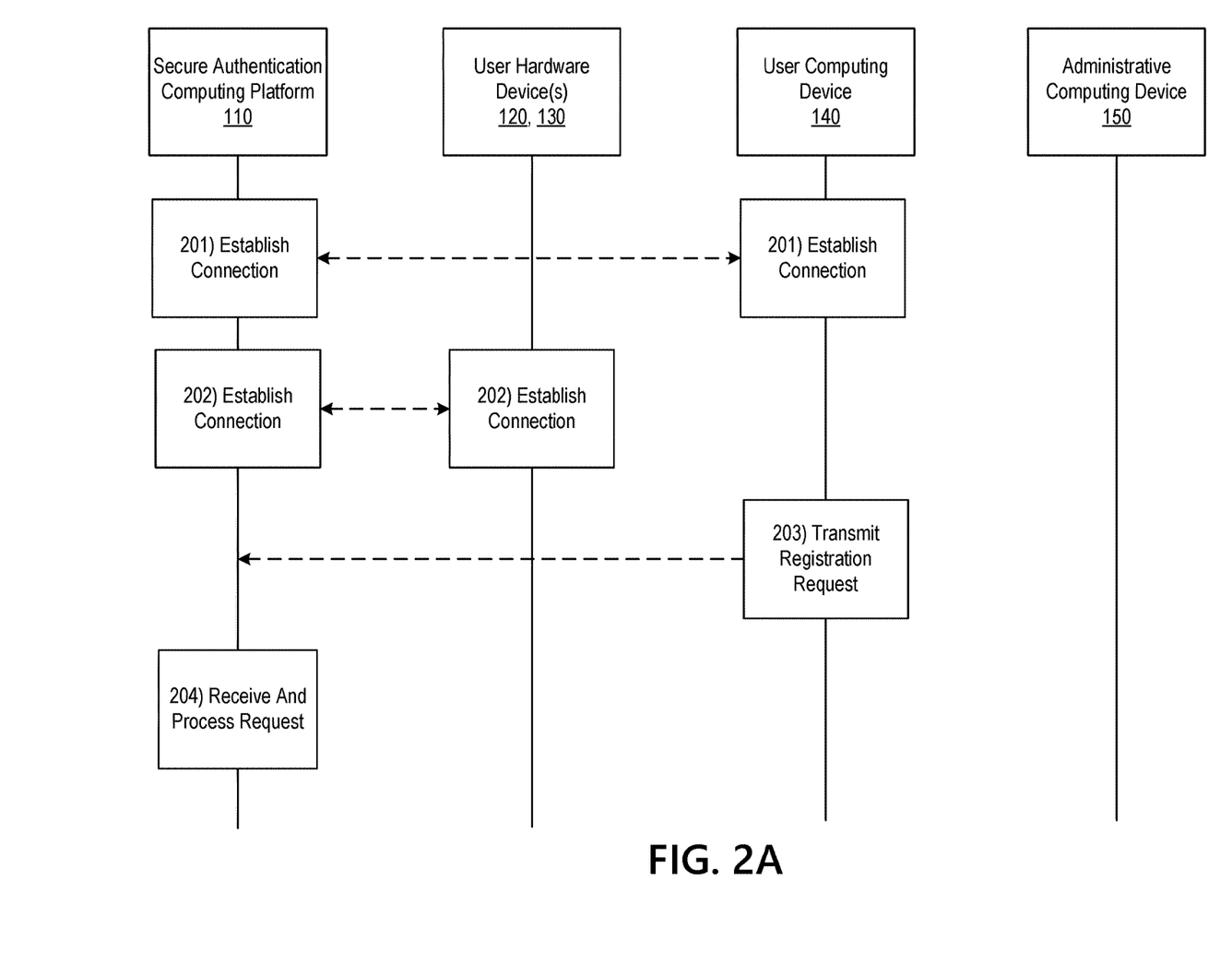
FIGS. 2A-2D depict an illustrative event sequence for implementing secure authentication functions through hardware analysis and monitoring in accordance with one or more aspects described herein.

With reference to FIG. 2A, at step 201, user computing device 140 may connect to secure authentication computing platform 110, For instance, a first wireless connection may be established between the user computing device 140 and the secure authentication computing platform 110. Upon establishing the first wireless connection, a communication session may be initiated between the user computing device 140 and the secure authentication computing platform 110.

At step 202, one or more user hardware devices 120, 130 (e.g., associated with user computing device 140) may connect to secure authentication computing platform 110. For instance, a second and/or third wireless connections may be established between the one or more user hardware devices 120, 130 and the secure authentication computing platform 110. Upon establishing the second and/or third wireless connections, a communication session may be initiated between the one or more user hardware devices 120, 130 and the secure authentication computing platform 110.

At step 203, user computing device 140 may transmit or send a request for registration and registration data, to the secure authentication computing platform 110. For instance, the request for registration and registration data may be transmitted during the communication session initiated upon establishing the first, second, and/or third wireless connections. In some examples, the registration request may include user hardware device 120 identifying data, user identifying data, or the like.

At step 204, secure authentication computing platform 110 may receive the registration request and may process the request. For instance, secure authentication computing platform 110 may evaluate the received data to determine whether additional data should be requested, or the like.

Figure 2B:
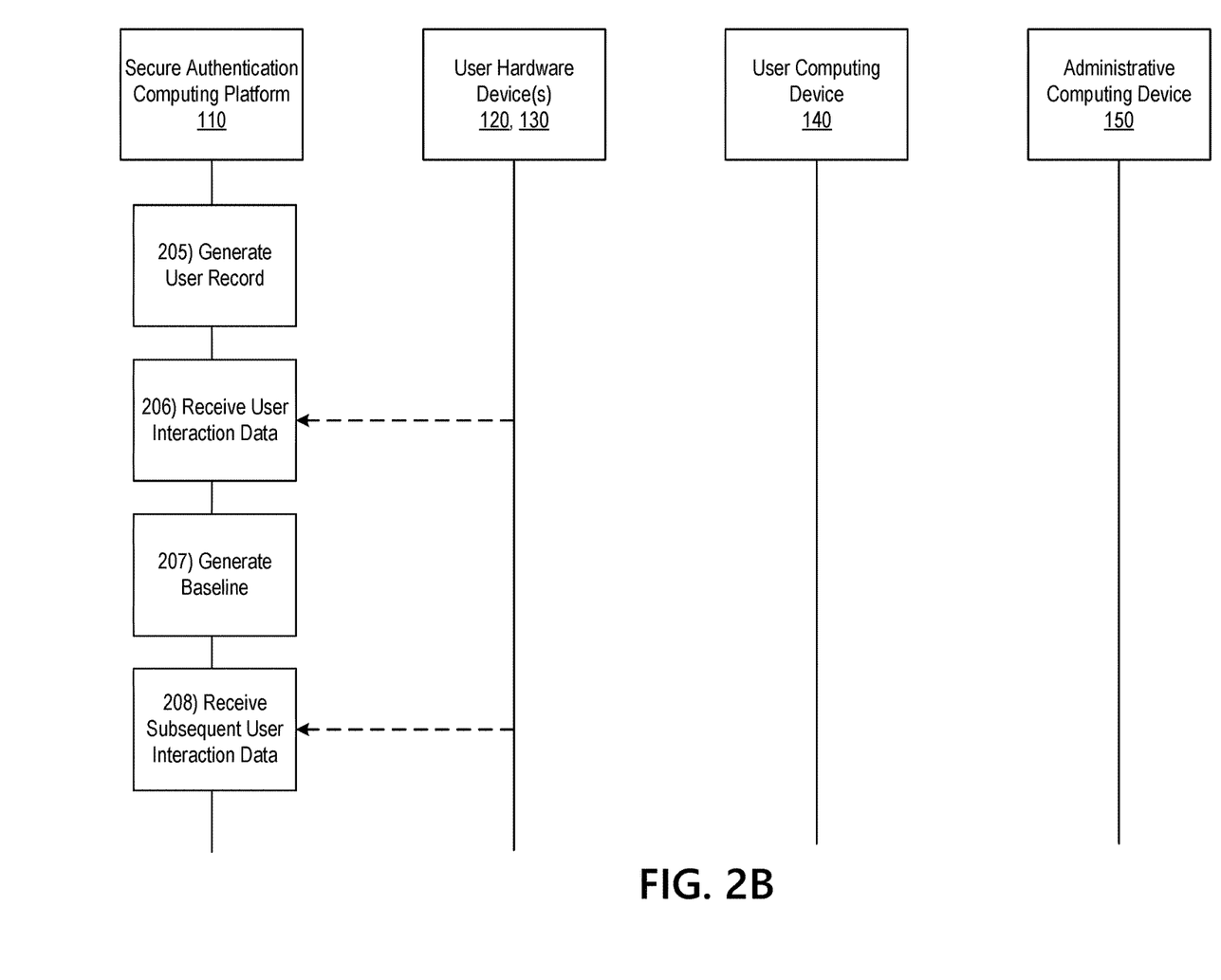

With reference to FIG. 2B, at step 205, based on sufficient data for registration being received, secure authentication computing platform 110 may generate a user record. For instance, a database may be updated or modified to include a user record associated with the user requesting registration.

At step 206, secure authentication computing platform 110 may receive, from one or more hardware devices (e.g., user hardware device 120, user hardware device 130), user interaction data associated with a user using the one or more hardware devices (e.g., user hardware device 120, user hardware device 130). In some examples, the one or more hardware devices may include a peripheral device (e.g., a keyboard or mouse). In some examples, the one or more hardware devices may include a wearable computing device (e.g., a smart watch, a fitness tracker). In addition, the one or more hardware devices may be registered in a network device database (e.g., registered hardware devices). In some arrangements, the user interaction data may include pressure data (e.g., typing pressure) captured by a pressure sensor of a keyboard. In some arrangements, the user interaction data may include cursor motion data, clicking data, or button data captured by a pointing device (e.g., an optical mouse, a stylus, a touchpad, a joystick, a trackball, and/or the like), including paths followed by a user in a network. In some arrangements, the user interaction data may include keystroke dynamics information (e.g., timing information that includes when each key was pressed and released as a user is typing). For instance, keystroke dynamics information may describe: a manner and rhythm in which a user types characters on a keyboard or keypad (e.g., how and the way the user uses a hardware device). In some examples, the user interaction data may include biometrics data captured by the wearable computing device (e.g., a smart watch, a fitness tracker).

At step 207, responsive to receiving the user interaction data, secure authentication computing platform 110 may establish a baseline indicating an expected usage pattern of the user. In some arrangements, secure authentication computing platform 110 may further take into account geolocation data of a user device in establishing baseline characteristics for the user. For instance, secure authentication computing platform 110 may consider factors such as a location of a user's cell phone, desk phone, wallet, building access card (e.g., radio frequency identification enabled device), and/or the like. In some arrangements, secure authentication computing platform 110 may further take into account an environmental condition at a geographic location of a user device in establishing baseline characteristics for the user.

At step 208, secure authentication computing platform 110 may receive, from the one or more hardware devices (e.g., user hardware device 120, user hardware device 130), subsequent user interaction data associated with the user using the one or more hardware devices (e.g., user hardware device 120, user hardware device 130).

Figure 2C:
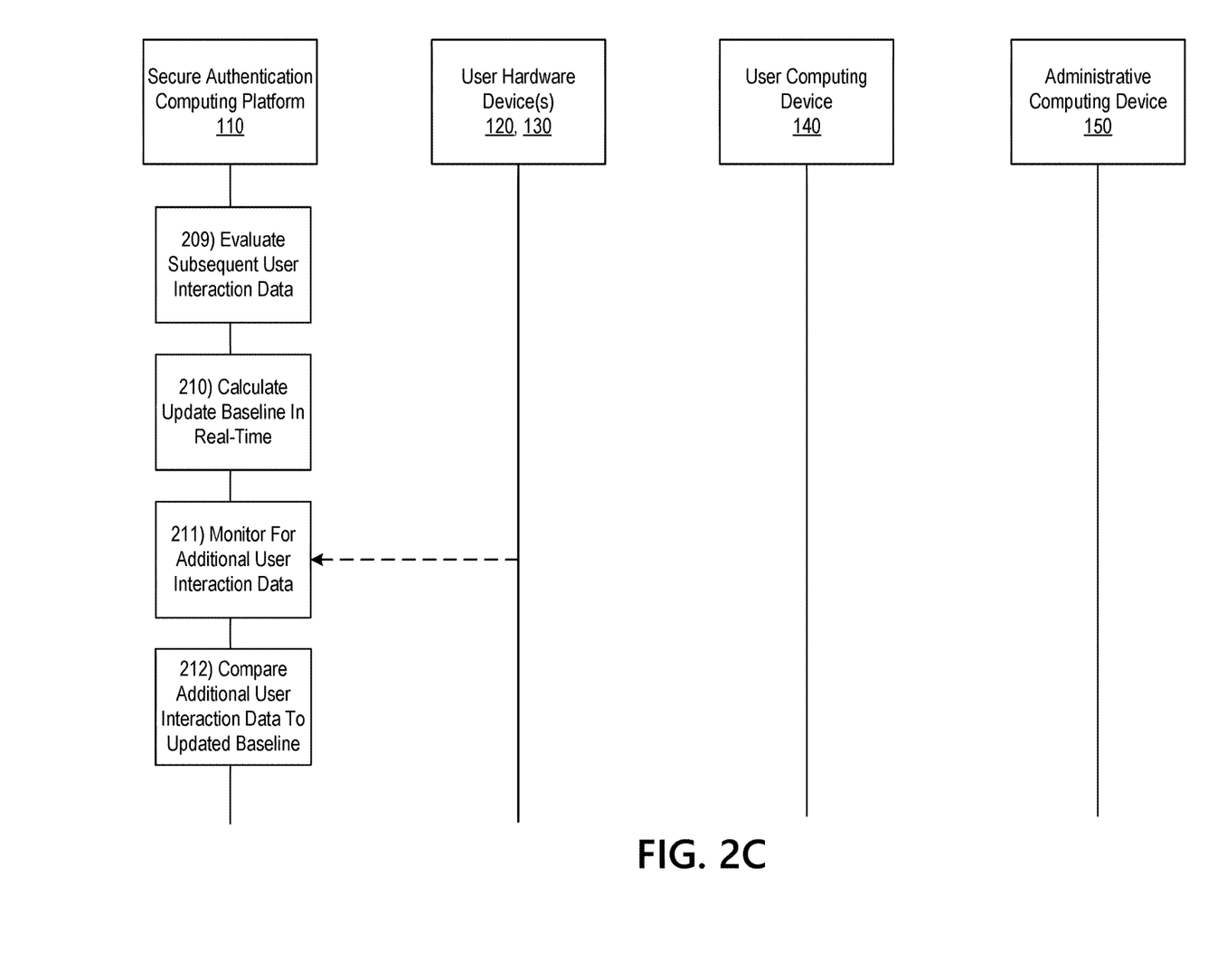

With reference to FIG. 2C, at step 209, secure authentication computing platform 110 may evaluate the subsequent user interaction data to ensure that the subsequent user interaction data is not unauthorized (e.g., outside an expected deviation from the baseline). At step 210, if the subsequent user interaction data is not unauthorized, secure authentication computing platform 110 may calculate and determine an updated (e.g., adjusted) baseline in real-time as the subsequent user interaction data is being received. In some examples, the calculation may be and/or include a moving average calculation, such as measuring a typing speed during a series of logins by a user and averaging the values. In this way, the baseline may be continuously updated to reflect normal usage pattern changes by the user. On the other hand, if the subsequent user interaction data is unauthorized, the baseline would not be updated with the unauthorized data, and secure authentication computing platform 110 may instead generate a notification security notification).

At step 211, secure authentication computing platform 110 may monitor for additional user interaction data received from the one or more hardware devices (e.g., user hardware device 120, user hardware device 130). For example, secure authentication computing platform 110 may monitor hardware usage behaviors on occurrence of an input being made via the hardware, on occurrence of a predefined event, or at predetermined or periodic intervals (e.g., seasonally, or every few seconds, minutes, hours, etc.). At step 212, secure authentication computing platform 110 may compare the additional user interaction data with the updated baseline.

Figure 2D:
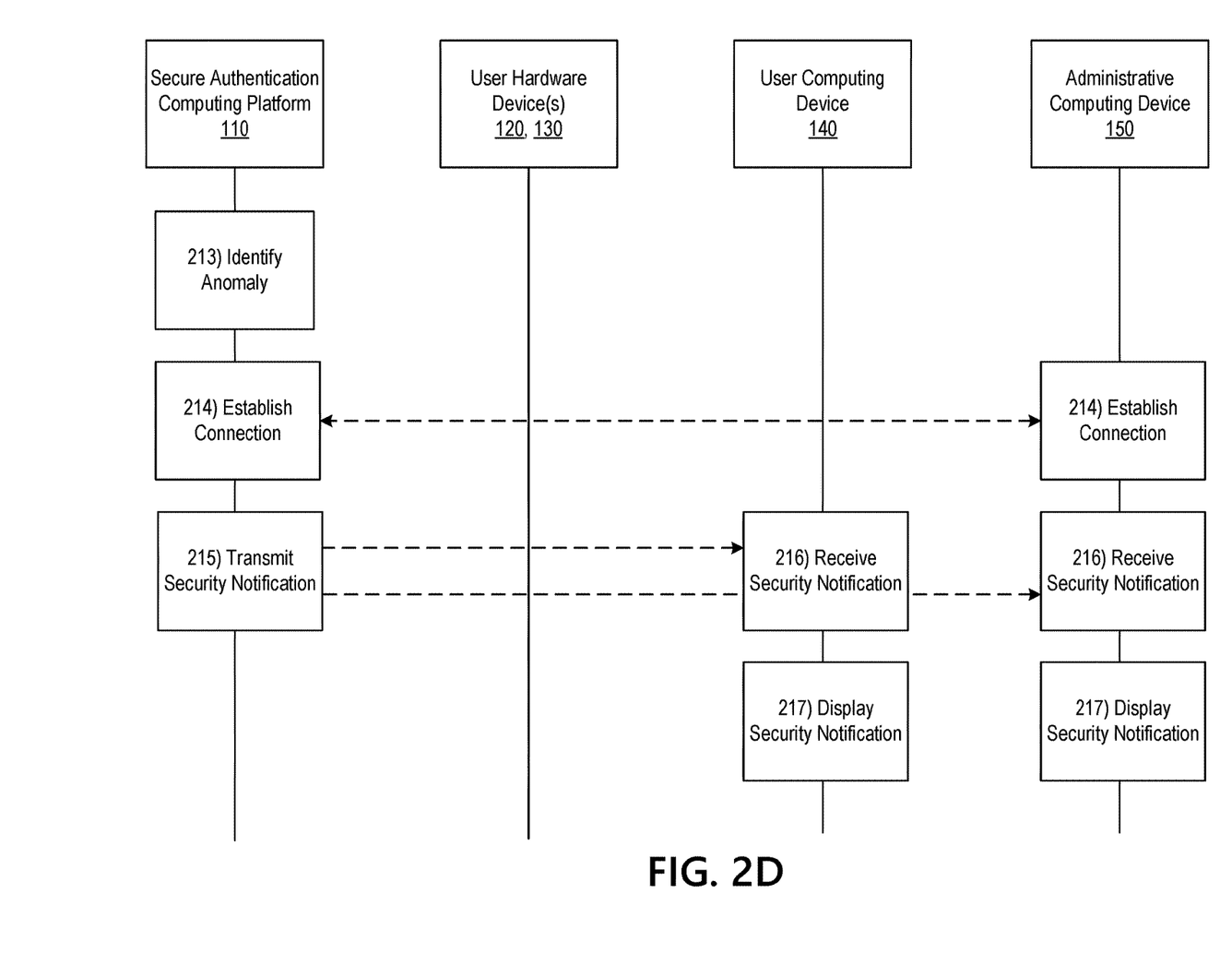

With reference to FIG. 2D, at step 213, secure authentication computing platform 110 may identify an anomaly in the user interaction data in response to the additional user interaction data deviating from the updated baseline by a predetermined threshold.

In some examples, in the case where the one or more hardware devices is a keyboard as described above, typing speed, typing pressure, and/or keystroke dynamics information may be captured and compared to an expected usage pattern or measurement, and if the information from the keyboard strays from the expected usage pattern or measurement then secure authentication computing platform 110 may initiate a notification or alert (e.g., a security notification), as described further below. For instance, if the typing speed is too uniform, this may indicate that a bot or machine is doing the typing, and if the typing speed is too fast, or has a sufficiently different speed than expected based on user baseline data, this may indicate that the user's credentials have been compromised.

In some examples, in the case where the one or more hardware devices is a wearable computing device (e.g., a smart watch, a fitness tracker) as described above, biometrics data may be captured and compared to an expected usage pattern or measurement, and if the biometrics data from the wearable computing device strays from the expected usage pattern or measurement, then secure authentication computing platform 110 may initiate a notification or alert (e.g., a security notification), as described further below.

At step 214, secure authentication computing platform 110 may connect to administrative computing device 150. For instance, a fourth wireless connection may be established between the secure authentication computing platform 110 and the administrative computing device 150. Upon establishing the fourth wireless connection, a communication session may be initiated between secure authentication computing platform 110 and the administrative computing device 150.

At step 215, secure authentication computing platform 110 may transmit or send one or more security notifications indicating potential unauthorized activity to one or more computing devices (e.g., user computing device 140, administrative computing device 150), For instance, the one or more security notifications may be transmitted or sent during the communication session initiated upon establishing the first and/or fourth wireless connections. In some examples, in transmitting the one or more security notifications indicating potential unauthorized activity, secure authentication computing platform 110 may determine an amount of deviation from the updated baseline and generate the one or more security notifications based on the amount of deviation from the updated baseline. For instance, if the deviation is within a first threshold, secure authentication computing platform 110 may send an alert to an information security team for risk and/or security review. The information security team may request additional authentication from the user and/or monitor or flag user activity. Additionally or alternatively, if the deviation is within a second threshold, secure authentication computing platform 110 may limit user access to certain data. Additionally or alternatively, if the deviation is within a third threshold, secure authentication computing platform 110 may shut down access to various systems or components until the user is authenticated.

In some examples, the mitigating actions might not be gradated. For instance, a mitigating action might be determined based on risk-based parameters or a context of the access (e.g., higher risk activities such as a user trying to gain root access to a server as compared to lower risk activities such as a user trying to gain access to a vacation calendar). Additionally or alternatively, a mitigating action might be determined based on a user's role and access permissions to resources within an organization. For instance, for a user having access to critical applications and systems, secure authentication computing platform 110 may immediately shut down access to various systems or components upon detection of potential unauthorized activity.

At step 216, the one or more computing devices (e.g., user computing device 140, administrative computing device 150) may receive the one or more security notifications. For example, the user computing device 140 (e.g., a computing device associated with the user of the hardware device(s) 120, 130) and/or the administrative computing device 150 (e.g., a computing device associated with an information security team) may receive the one or more security notifications while the first, second, and/or third wireless data connections are established. In some instances, the one or more computing devices (e.g., user computing device 140, administrative computing device 150) may receive, along with the one or more security notifications, the one or more commands directing the one or more computing devices (e.g., user computing device 140, administrative computing device 150) to display or otherwise execute (e.g., modify system access, prevent system access, or the like) the one or more security notifications.

Figure 3:
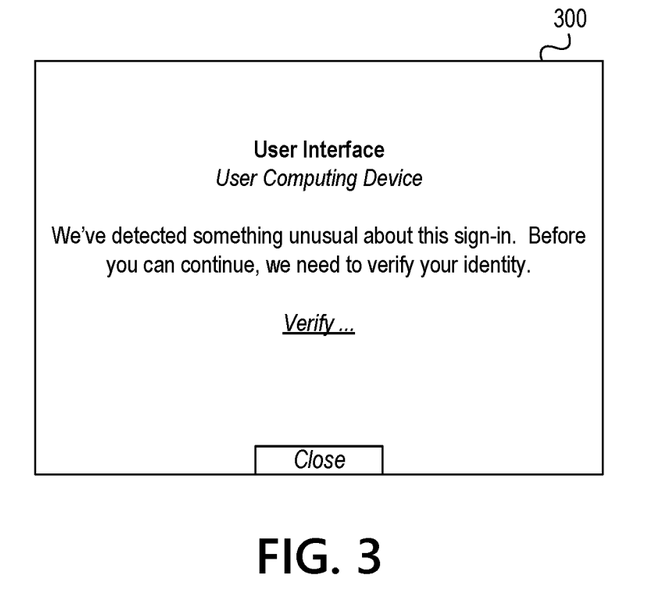
FIGS. 3 and 4 illustrate example user interfaces including security notifications that may be generated in accordance with one or more aspects described herein.
Figure 4:
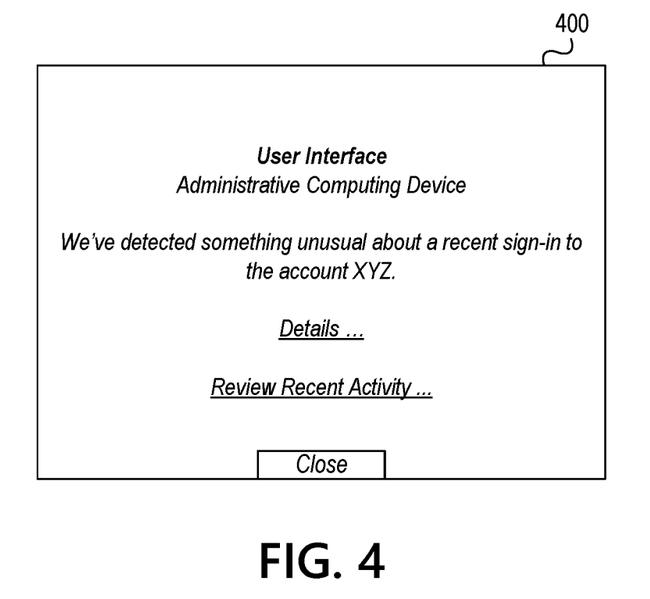

At step 217, the one or more computing devices (e.g., user computing device 140, administrative computing device 150) may display the one or more security notifications. For example, the user computing device 140 may display a graphical user interface similar to graphical user interface 300, which is shown in FIG. 3. For example, the user computing device 140 may display a notification that the user's access to various systems or components have been temporarily suspended as a result of the potential unauthorized activity that has been detected. Additionally or alternatively, the user computing device 140 may prompt the user for additional authentication information (e.g., security questions and answers). Similarly, in displaying the one or more security notifications, the administrative computing device 150 may display a graphical user interface similar to graphical user interface 400, which is shown in FIG. 4. For example, the administrative computing device 150 may display a notification that unauthorized activity has been detected on a user's account, and that further confirmation and/or authentication may be required. It will be appreciated that other and/or different notifications may also be provided.

Additionally, in some embodiments, the one or more hardware devices may be frequency synchronized with a reference signal, and secure authentication computing platform 110 may leverage frequency hopping to check that the hardware device being used is in sync and is approved or known hardware. In the case of unapproved or unauthorized hardware being detected, secure authentication computing platform 110 may transmit or send one or more security notifications indicating potential unauthorized activity to one or more computing devices (e.g., user computing device 140, administrative computing device 150), in a manner similar to steps 215-217.

Figure 5:
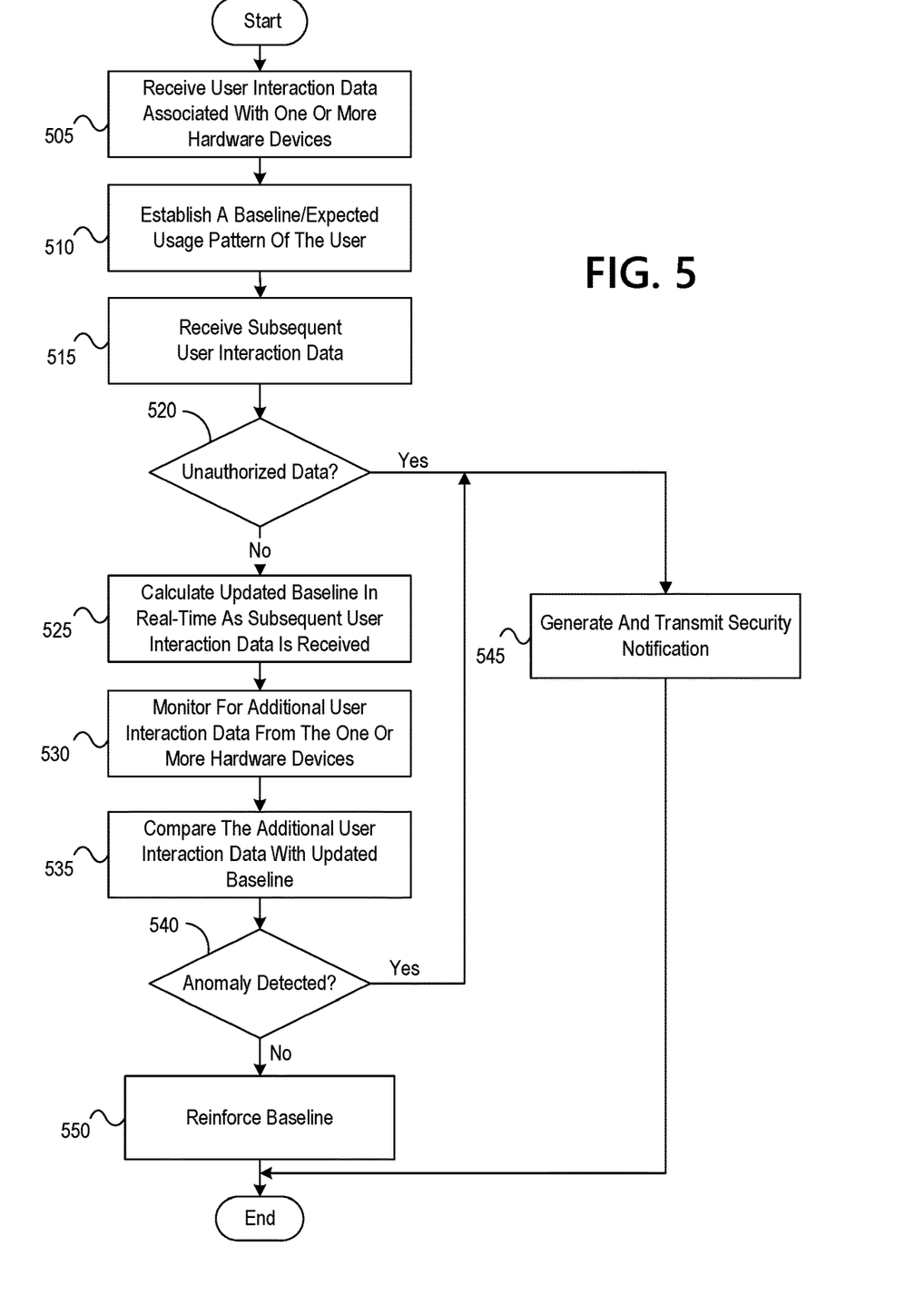
FIG. 5 illustrates an illustrative method for implementing secure authentication functions through hardware analysis and monitoring according to one or more aspects described herein.

FIG. 5 illustrates an illustrative method for implementing secure authentication functions through hardware analysis and monitoring in accordance with one or more example embodiments. Referring to FIG. 5, at step 505, a computing platform having at least one processor, a communication interface, and memory may receive, from one or more hardware devices, user interaction data associated with a user using the one or more hardware devices. At step 510, responsive to receiving the user interaction data, the computing platform may establish a baseline indicating an expected usage pattern of the user. At step 515, the computing platform may receive, from the one or more hardware devices, subsequent user interaction data associated with the user using the one or more hardware devices. At step 520, the computing platform may evaluate the subsequent user interaction data to determine whether the subsequent user interaction data is unauthorized. If the subsequent user interaction data is unauthorized, the computing platform may proceed to step 545 to generate and transmit a security notification. If the subsequent user interaction data is not unauthorized, the computing platform may proceed to step 525. At step 525, the computing platform may calculate an updated baseline in real-time as the subsequent user interaction data is being received. At step 530, the computing platform may monitor for additional user interaction data received from the one or more hardware devices. At step 535, the computing platform may compare the additional user interaction data with the updated baseline. At step 540, the computing platform may identify whether an anomaly was detected in the user interaction data. If an anomaly was detected (e.g., it is determined that the additional user interaction data deviates from the updated baseline by a predetermined threshold), the computing platform may proceed to step 545. At step 545, the computing platform may generate and transmit, to a computing device, a security notification indicating potential unauthorized activity. In addition, transmitting the security notification may cause the security notification to display on the computing device. If an anomaly was not detected, the computing platform may proceed to step 550. At step 550, the computing platform may continue to update/reinforce the corresponding baseline.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive, from one or more hardware devices, user interaction data associated with a user using the one or more hardware devices, wherein the user interaction data associated with a user using the one or more hardware devices comprises a user typing speed, a user typing pressure, hardware device lags, data relating to an environmental condition at a geographic location of the hardware device, and keystroke dynamics information comprising timing information when each key was pressed and when each key was released, and wherein the one or more hardware devices is frequency synchronized with a reference signal;
   determine, via frequency hopping, if the one or more hardware devices is approved or known hardware;
   determine, via the frequency hopping, if the one or more hardware devices is unapproved or unauthorized hardware;
   responsive to receiving the user interaction data, establish a baseline indicating an expected usage pattern of the user;
   receive, from the one or more hardware devices, subsequent user interaction data associated with the user using the one or more hardware devices;
   determine whether the subsequent user interaction data is unauthorized;
   based on the subsequent user interaction data not being unauthorized, calculate an updated baseline in real-time as the subsequent user interaction data is being received;
   monitor for additional user interaction data received from the one or more hardware devices;
   compare the additional user interaction data with the updated baseline;
   identify an anomaly in the user interaction data in response to the additional user interaction data deviating from the updated baseline by a predetermined threshold; and
   transmit, to a computing device, a security notification indicating potential unauthorized activity, wherein transmitting the security notification causes the security notification to display on the computing device.

2. The computing platform of claim 1, wherein the one or more hardware devices comprise a peripheral device registered in a network device database.

3. The computing platform of claim 1, wherein the user typing pressure is captured by a pressure sensor of a keyboard.

4. The computing platform of claim 1, wherein receiving the user interaction data associated with a user using the one or more hardware devices comprises receiving cursor motion data or clicking data captured by a pointing device.

5. The computing platform of claim 1, wherein receiving the user interaction data associated with a user using the one or more hardware devices comprises receiving keystroke dynamics information.

6. The computing platform of claim 1, wherein the one or more hardware devices comprise a wearable computing device.

7. The computing platform of claim 1, wherein receiving the user interaction data associated with a user using the one or more hardware devices comprises receiving biometrics data captured by a wearable computing device.

8. The computing platform of claim 1, wherein transmitting the security notification indicating potential unauthorized activity comprises:
   determining an amount of deviation from the updated baseline; and
   generating the security notification based on the amount of deviation from the updated baseline.

9. The computing platform of claim 1, wherein calculating the updated baseline in real-time as the subsequent user interaction data is being received comprises a moving average calculation.

10. The computing platform of claim 1, wherein monitoring for additional user interaction data received from the one or more hardware devices comprises monitoring usage behaviors at predetermined intervals.

11. The computing platform of claim 1, wherein establishing the baseline indicating the expected usage pattern for the user further comprises:
receiving geolocation data of a user device; and
establishing the baseline based on the geolocation data of the user device.

12. The computing platform of claim 1, wherein establishing the baseline indicating the expected usage pattern for the user further comprises:
receiving data relating to an environmental condition at a geographic location of a user device; and
establishing the baseline based on the environmental condition at the geographic location of the user device.

13. A method comprising:
receiving, from one or more hardware devices, user interaction data associated with a user using the one or more hardware devices, wherein the user interaction data associated with a user using the one or more hardware devices comprises a user typing speed, a user typing pressure, hardware device lags, data relating to an environmental condition at a geographic location of the hardware device, and keystroke dynamics information comprising timing information when each key was pressed and when each key was released, and wherein the one or more hardware devices is frequency synchronized with a reference signal;
determining, via frequency hopping, if the one or more hardware devices is approved or known hardware;
determining, via the frequency hopping, if the one or more hardware devices is unapproved or unauthorized hardware;
responsive to receiving the user interaction data, establishing a baseline indicating an expected usage pattern of the user;
receiving, from the one or more hardware devices, subsequent user interaction data associated with the user using the one or more hardware devices;
determine whether the subsequent user interaction data is unauthorized;
based on the subsequent user interaction data not being unauthorized, calculating an updated baseline in real-time as the subsequent user interaction data is being received;
monitoring for additional user interaction data received from the one or more hardware devices;
comparing the additional user interaction data with the updated baseline;
identifying an anomaly in the user interaction data in response to the additional user interaction data deviating from the updated baseline by a predetermined threshold; and
transmitting, to a computing device, a security notification indicating potential unauthorized activity, wherein transmitting the security notification causes the security notification to display on the computing device.

14. The method of claim 13, wherein the one or more hardware devices comprise a peripheral device registered in a network device database.

15. The method of claim 13, wherein the user typing pressure is captured by a pressure sensor of a keyboard.

16. The method of claim 13, wherein receiving the user interaction data associated with a user using the one or more hardware devices comprises receiving cursor motion data or clicking data captured by a pointing device.

17. The method of claim 13, wherein receiving the user interaction data associated with a user using the one or more hardware devices comprises receiving keystroke dynamics information.

18. One or more non-transitory computer-readable media storing instructions that, when executed by a computing platform comprising at least one processor, memory, and a communication interface, cause the computing platform to:
receive, from one or more hardware devices, user interaction data associated with a user using the one or more hardware devices, wherein the user interaction data associated with a user using the one or more hardware devices comprises a user typing speed, a user typing pressure, hardware device lags, data relating to an environmental condition at a geographic location of the hardware device, and keystroke dynamics information comprising timing information when each key was pressed and when each key was released, and wherein the one or more hardware devices is frequency synchronized with a reference signal;
determine, via frequency hopping, if the one or more hardware devices is approved or known hardware;
determine, via the frequency hopping, if the one or more hardware devices is unapproved or unauthorized hardware;
responsive to receiving the user interaction data, establish a baseline indicating an expected usage pattern of the user;
receive, from the one or more hardware devices, subsequent user interaction data associated with the user using the one or more hardware devices;
determine whether the subsequent user interaction data is unauthorized;
based on the subsequent user interaction data not being unauthorized, calculate an updated baseline in real-time as the subsequent user interaction data is being received;
monitor for additional user interaction data received from the one or more hardware devices;
compare the additional user interaction data with the updated baseline;
identify an anomaly in the user interaction data in response to the additional user interaction data deviating from the updated baseline by a predetermined threshold; and
transmit, to a computing device, a security notification indicating potential unauthorized activity, wherein transmitting the security notification causes the security notification to display on the computing device.

* * * * *